United States Patent [19]
Brown

[11] Patent Number: 5,625,729
[45] Date of Patent: Apr. 29, 1997

[54] OPTOELECTRONIC DEVICE FOR COUPLING BETWEEN AN EXTERNAL OPTICAL WAVE AND A LOCAL OPTICAL WAVE FOR OPTICAL MODULATORS AND DETECTORS

[76] Inventor: Thomas G. Brown, 205 Doncaster Rd., Rochester, N.Y. 14623

[21] Appl. No.: 289,936

[22] Filed: Aug. 12, 1994

[51] Int. Cl.$^6$ ............................... G02B 5/18; G02B 6/34
[52] U.S. Cl. ............................. 385/31; 359/573; 385/10; 385/12; 385/37; 385/40
[58] Field of Search ................... 385/1–4, 8–10, 385/12, 15, 27, 28, 30, 31, 37, 39–42, 48, 50; 359/566, 569, 572, 573

[56] References Cited

U.S. PATENT DOCUMENTS

| | | | |
|---|---|---|---|
| 3,813,142 | 5/1974 | Buhrer | 359/573 X |
| 4,466,694 | 8/1984 | MacDonald | 385/37 |
| 4,583,818 | 4/1986 | Chen et al. | 385/37 |
| 4,645,293 | 2/1987 | Yoshida et al. | 385/40 |
| 4,749,248 | 6/1988 | Aberson, Jr. et al. | 385/37 |
| 4,881,791 | 11/1989 | Mallinson et al. | 385/37 |
| 5,157,537 | 10/1992 | Rosenblatt | 385/37 X |
| 5,337,183 | 8/1994 | Rosenblatt | 385/37 X |
| 5,438,637 | 8/1995 | Nilsson et al. | 385/10 |

Primary Examiner—John D. Lee
Attorney, Agent, or Firm—Choate, Hall & Stewart

[57] ABSTRACT

An optoelectronic device for coupling between an external optical wave and a local optical wave. The local wave is supported by a multiplicity of electrodes and a structure associated with the electrodes. The electrodes are spaced in a substantially regular pattern and are adapted for two functions. First, the electrodes resonantly couple between the external wave and the local wave. Second, the electrodes allow a potential difference between adjacent electrodes.

57 Claims, 8 Drawing Sheets

OPTOELECTRONIC DEVICE FOR COUPLING BETWEEN AN EXTERNAL OPTICAL WAVE AND A LOCAL OPTICAL WAVE FOR OPTICAL MODULATORS AND DETECTORS

BACKGROUND OF THE INVENTION

1. Field of the Invention

This invention relates to an optoelectronic coupler. Two applications for the coupler are as an optical modulator or as an optical detector.

Recent advances in technology have resulted in an emphasis on the photonics field—the field which concerns the generation, manipulation, modulation and detection of light and optical waves, where light and optical are taken to refer to the ultraviolet, visible, near-infrared and mid-infrared regions (up to wavelengths of approximately 15 µm) of the electromagnetic spectrum. There has also been a corresponding increase in interest in photonic devices.

Specifically, optical modulators which modulate the properties of optical waves incident upon them and detectors which sense the strength of incident waves are two fundamental building blocks for almost all photonics systems. For example, optical fibers are becoming more prevalent with each passing day, and, in such a system, information is communicated by encoding the information on a light beam, transmitting the beam to the receiver, and decoding the received beam. The encoding can be achieved by using a constant light source modulated by an optical modulator, and a detector is required to decode the received beam. As another example, as computers become more powerful, they are becoming communications-limited rather than processor-limited. That is, the bottleneck on computer speed tends to lie more and more in the time required to communicate between various parts of the computer rather than in the time required to perform the computations. One potential solution is to use optical rather than electronic interconnects since photonics technology offers a potentially large speed advantage. In such an approach, optical modulators and detectors may be used to encode and decode bits in much the same manner as in fiber systems. As a final example, the advent of mass storage devices and high bandwidth communications channels is allowing our society to move towards picture-based communications, the explosion in the number of fax machines and the amount of television programming being prime examples, and the display and capture of these images requires both modulators and detectors. In a fax machine, detectors may be used to capture the image on the transmit side while modulators may be used to recreate the image, a la laser printers, on the receive side. Detectors and modulators may play similar roles in the transmission of video. As a direct result of these technological advances, there is an ever increasing demand for these devices and improvements in these devices.

However, devices such as detectors and modulators which bridge the gap between electrons and photons must rely on fundamental physical phenomena. In the context of this invention, the phenomena relied upon are primarily the coupling of optical waves to one another, the application or sensing of electronic effects through electrodes, and the interaction of photons and electrons in special material systems, such as semiconductors or electro-optic materials. Therefore, advances in these devices depend in large part on either designs which enhance the basic physical effects or practical advances, such as improvements in device cost, reliability, fabrication, ease of operation, etc.

2. Description of the Related Art

Since the invention lies at the intersection of several fields, the related art may also be divided into distinct areas. For convenience, complete reference citations are collected in the last section of the description of the preferred embodiment.

One area of related art concerns the design of gratings to couple between optical waves. For example, [Maystre, et. al., 1978], [Magnusson and Wang, 1993], [Delort and Maystre, 1993] and [Vincent, 1993], the teachings of which are incorporated herein by reference, describe approaches by which the detailed optical properties of the structures described herein may be calculated. These descriptions are complete electromagnetic treatments and include the excitation of surface plasmons, total-internal-reflection (TIR) guided waves, and surface evanescent waves. For convenience, the term local wave will be used to refer to these three types of waves. [Campbell, 1993] theoretically describes the enhancement of light absorption in textured surfaces using a geometrical approach. [Sambles, et. al., 1991] describes the general theory of optical excitation of surface plasmons, including the use of periodic structures, and [Bryan-Brown, et. al., 1991] describes the coupling of surface plasmons to each other. While the teachings of these references may be used to design certain aspects of the current invention, the references themselves are primarily directed towards the purely optical coupling of waves via static structures. The issue of dynamic operation of the devices is unsatisfactorily addressed, as are any electrical aspects.

There are devices which rely on both the coupling of optical waves and some sort of electrical functionality. One application area is that of waveguide modulators. [Simon and Lee, 1988] and [Caldwell and Yearman, 1991] describe dynamic coupling between a wave external to the device and a TIR guided wave or a surface plasmon, respectively. However, the coupling is achieved by prism-coupling or frustrated total internal reflection coupling, which has several practical disadvantages compared to the approach of grating coupling used in the current invention. In the area of grating modulators, [Evans and Hall, 1990] and [Collins, et. al., 1990] both teach the use of a grating to couple between optical waves and, furthermore, the coupling efficiency is modulated by varying a voltage impressed across part of the structure. However, the entire grating is held at one potential and the voltage difference is impressed between the grating and another part of the structure, typically the bulk of a substrate. This is unacceptable because forming electrodes in this fashion and then impressing a voltage across the bulk of the device results in a slow operating speed for the device. A similar situation exists with respect to [Magnusson and Wang, 1993], [Wang and Magnusson, 1993], and [Rosenblatt, 1992]. They teach the use of a grating as a coupling device and suggest methods for electrically varying the optical properties of the grating. However, the electrodes are not adapted for fast operation of the device, as discussed previously. Furthermore, an additional structure is often required to achieve the electrical function, resulting in a more complicated device. In the area of detectors, [Brueck, et. al, 1985] has investigated the use of gratings to couple the incident light to the detector active region, thus increasing the quantum efficiency of the detector. However, as in the devices discussed above, the electrode structure used to sense the generated photocurrent is not adapted to permit high speed operation of the device.

Another area of related art is the general field of optical modulators. As a representative sample of the general literature, [Lentine, et. al., 1989], [Pezeshki, et. al., 1990], [Treyz, et. al., 1990], and [Xiao, et. al, 1991] all teach types of optical modulators which are not directly related to the current invention. In particular, they differ from the current invention in at least one of the following aspects. First, some of the devices are unsatisfactorily slow due to the electrode structure used. Second, some are not based on the coupling of optical waves. Third, none of the devices combine the fast electrode structure and the optical coupling device into a single structure. Finally, many of the devices are not based on VLSI fabrication techniques and so cannot take advantage of the existing manufacturing base and also cannot be as easily integrated with other VLSI circuits.

A final area of related art is the use of specially adapted electrodes. In the modulator area, interdigitated electrodes have been used to apply voltage patterns across electro-optic materials. [Alferness, 1982] and [Hammer, et. al., 1973] teach the use of such electrodes to modulate the optical properties of a waveguide, with the resulting variations in the waveguide controlling the coupling of one waveguide mode to another. However, the electrodes in these cases couple the two modes only indirectly and the restriction that both modes be internal to the waveguide makes this approach unsuitable for the applications of the current invention. Specialized electrode structures have also been used in detectors, particularly metal-semiconductor-metal (MSM) detectors, to increase the speed of these devices. For example, see [Alexandrou, et. al., 1993], [Bassous, et. al, 1991], [Chou and Liu, 1992], [Klingenstein, et. al., 1992], and [Soole and Schumacher, 1991]. [Ghioni, et. al., 1994] have also used specialized electrodes in a nano-detection structure based on a lateral series of PIN diodes. However, in none of these devices are the electrodes adapted to couple the incident optical wave to a local wave in the detector active area, which would result in a significant increase in efficiency.

SUMMARY OF THE INVENTION

The invention is an optoelectronic device for coupling between an external optical wave and a local optical wave. The local wave is supported by a multiplicity of electrodes and a structure associated with the electrodes. The multiplicity of electrodes are spaced in a substantially regular pattern and are adapted for two functions. First, the electrodes resonantly couple between the external wave and the local wave. Second, the electrodes allow a potential difference between adjacent electrodes.

In one embodiment, the multiplicity of electrodes are substantially planar, metal, interdigitated electrodes including first fingers and second fingers. The electrodes are further adapted to allow a potential difference between the first fingers and the second fingers. In addition, the structure associated with the electrodes is a substantially planar silicon substrate contacting the electrodes. The local wave is a surface plasmon supported by the metal electrodes and silicon substrate. The index of refraction of the silicon may be altered by varying the potential difference across the first and second fingers of the electrodes.

In another embodiment, the electrodes are metal electrodes as in the previous paragraph and the structure associated with the electrodes includes a silicon substrate as described above. However, the substrate does not contact the electrodes. Instead, p-doped semiconductor regions form the contact between the first fingers and the substrate; while n-doped semiconductor regions perform the same function for the second fingers. The local wave is a total-internal-reflection guided wave and the index of retraction of the silicon may be altered as previously.

In other embodiments, the invention may be configured to modulate or detect incident light.

DESCRIPTION OF THE PREFERRED EMBODIMENT

1. Introduction

Figure 1A:
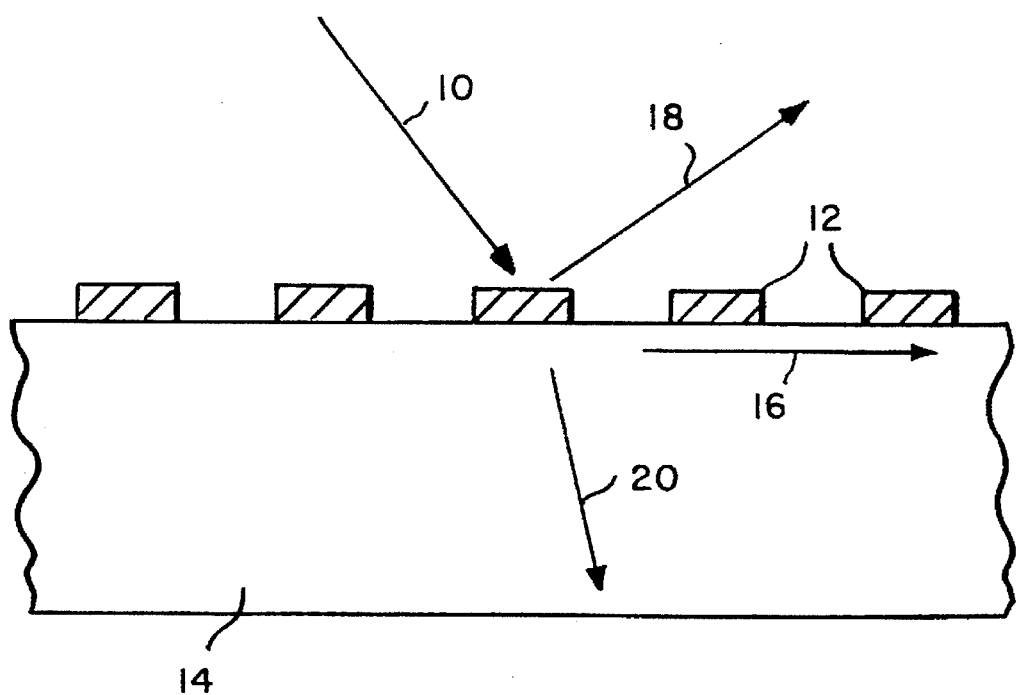
FIG. 1A is a side cross section of an embodiment of the invention.
Figure 1B:
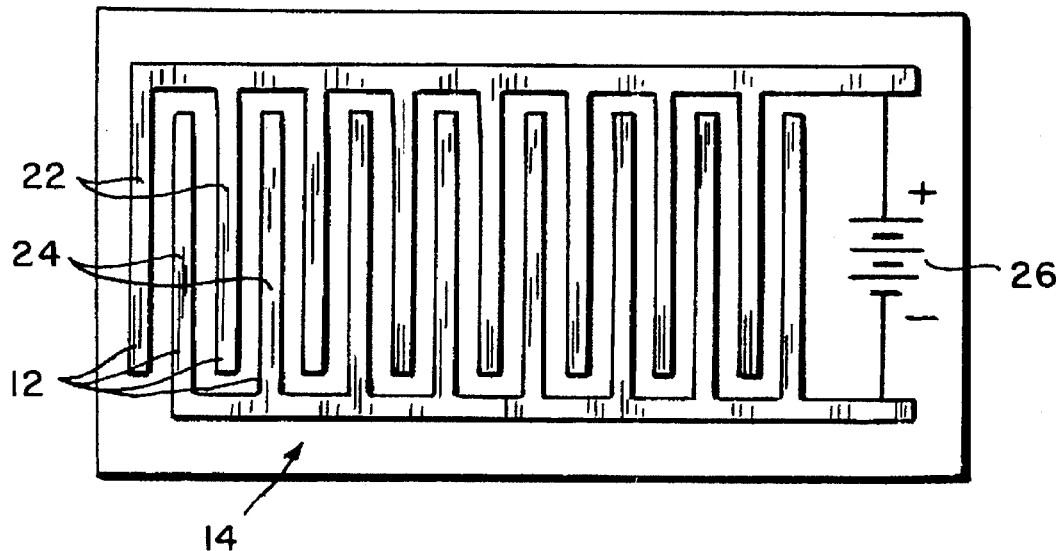
FIG. 1B is a top view of the embodiment of FIG. 1A.
Figure 2A:
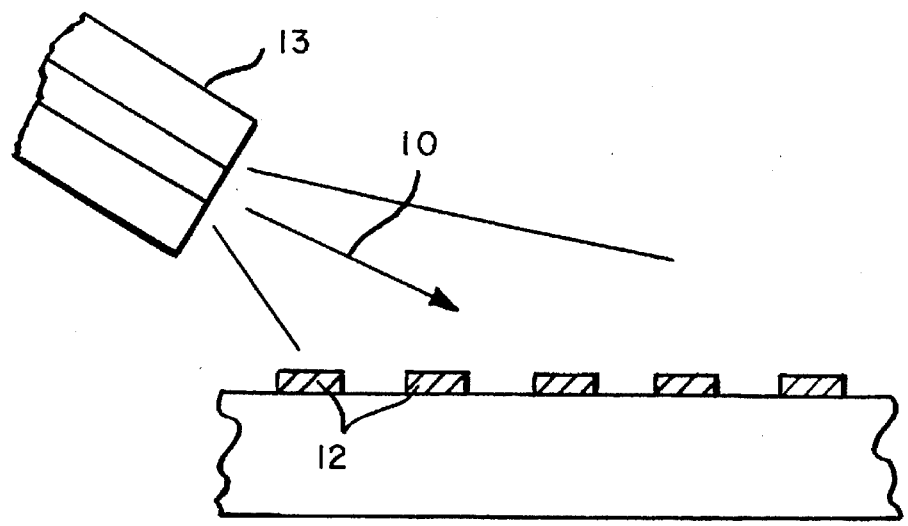
FIG. 2A is an illustration of an output of a fiber as the external wave.
Figure 2B:
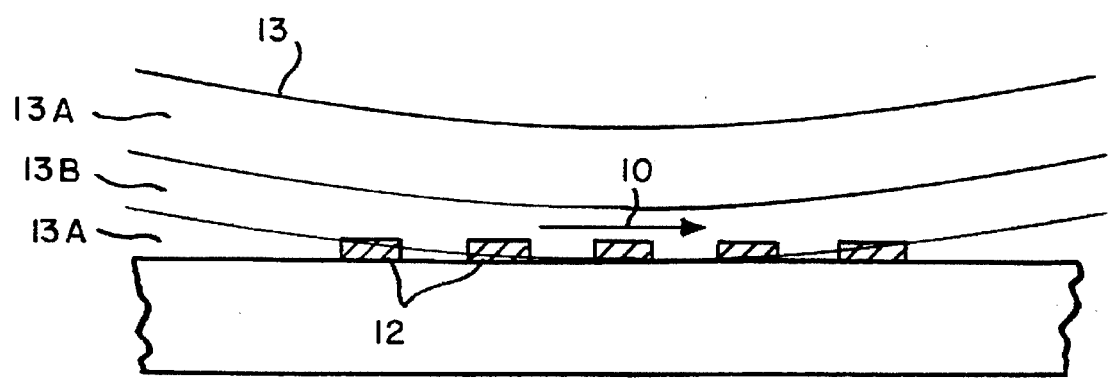
FIG. 2B is an illustration of a guided mode of a fiber as the external wave.

A preferred embodiment of the invention is explained with the aid of FIGS. 1A–1B. In FIG. 1A, an external wave of light 10 is incident upon a metal grating 12. The external wave 10 may be produced in a number of ways. For example, the external wave 10 may be produced by a separate source and then propagate through a homogeneous medium to the invention, as might be the case if the invention were used to modulate the separate source. Alternatively, in the case of optical interconnects, the wave may be directed to the invention by optical elements such as a lens or lens array, mirrors, diffractive optical elements, or a computer generated hologram. Fibers may also be used to generate external waves as shown in FIGS. 2A–2B. In FIG. 2A, the external wave 10 is directed to the grating 12 by an optical fiber 13. In an interesting embodiment in which the device is used to modulate a reflected wave 18, the same fiber 13 may be used to generate the external wave 10 and to recapture the reflected wave 18. In FIG. 2B, the external wave 10 is a guided wave of the fiber 13 and the cladding 13A of the fiber 13 may be partially stripped to allow the grating 12 to couple the wave 10 from the core 13B. The term external wave is meant to include but not be limited to waves generated by these means. The term specifically excludes guidedwaves, such as TIR guided waves and surface plasmons, which are guided by the structure of the invention as described below. In addition, FIG. 1A is not meant to limit the invention to a particular spatial relationship between the external wave 10, the grating 12 and the substrate 14, which in this embodiment represents the remainder of the device. For example, in FIG. 1A, the external wave 10 is depicted as encountering the grating 12 and then the substrate 14. However, it is equally valid for the wave 10 to approach from the substrate side, thus encountering the substrate 14 and then the grating 12. Other spatial combinations, particularly with regard to the more complex embodiments described below, will be apparent to those skilled in the art.

The grating 12 is fabricated on the surface of a silicon substrate 14 and the interface between the grating 12 and substrate 14 is capable of supporting a surface plasmon 16 which propagates along the two structures. The external wave 10 is coupled by the grating 12 into reflected waves 18 and transmitted waves 20, as well as the surface plasmon 16. Although these waves are indicated by single arrows, it is to be understood that they may be a number of waves corresponding, for example, to different diffraction orders. In the preferred embodiment, each stripe of the metallic grating 12 also functions as an electrode. The electrodes 12 are electrically connected in an interdigitated fashion, forming first and second fingers 22, 24, and the electrical function of the device may be achieved through these fingers. For example, a voltage may be applied across adjacent electrodes 12 or the current flowing between adjacent electrodes may be sensed. This arrangement of electrodes allows for fast electrical operation of the device while maintaining the optical coupling function.

This and the majority of the following embodiments may be fabricated via techniques familiar to those skilled in the art. Such techniques are described in standard sources such as [Mayer and Lau, 1990] and [Sze, 1988], the teachings of which are incorporated herein by reference. Of the steps required to fabricate the various embodiments of the invention, the photolithography step will often be the most stressing. For some applications, conventional optical lithography may be used. However, in some cases the critical dimensions of the device (e.g., the width of the electrodes 12) will be small enough to require other types of lithography, such as electron-beam lithography or x-ray lithography. For the remainder of this disclosure, the methods for fabricating embodiments of the invention will be omitted for purposes of brevity except in cases where one skilled in the art would not be familiar with the required fabrication.

In the preferred embodiment of the device operated as a modulator, the reflected wave 18 may be taken as the output wave. The reflected wave 18 is chosen for illustrative purposes. The transmitted wave 20 or the local wave 16 may also be chosen as the output wave. The strength of the output wave may be modulated by varying the efficiency with which the incident wave 10 couples into the various modes 16, 18, 20. A voltage difference 26 is impressed across the two sets of fingers 22, 24, thus generating an electric field in the substrate 14. By varying the voltage difference 26, the electric field and hence the refractive index of the substrate 14 may be changed, thus changing the coupling efficiency between the input wave 10 and output wave 18. The specific mechanism which effects the change in refractive index operates as follows. Light is absorbed in the silicon substrate 14 and produces electron-hole pairs which change the refractive index via the free-carrier plasma effect. The applied voltage 26 may be used to sweep electron-hole pairs out of the substrate 14, thus varying both the number of electron-hole pairs remaining and the resulting index change. For a more detailed discussion of methods by which an applied field may achieve a refractive index change in silicon, see [Sorer and Bennett, 1987], the teachings of which are incorporated herein by reference.

The invention may also be used to detect light. In a preferred embodiment, the voltage 26 is used to set up an electric field within the substrate 14. The incident light 10 then generates electron-hole pairs and this effect is enhanced due to coupling to the surface plasmon 16. As a result of the electric field, the generated electron-hole pairs are swept from the substrate 14 to the grating/electrode 12, and the strength of the incident light may be determined by measuring the current which flows between fingers 22, 24.

While the above discussion discloses a specific embodiment, it is to be understood that the invention is not limited to this embodiment.

The following sections discuss the invention in more detail. In particular, the next section discusses various aspects regarding local waves, of which the surface plasmon 16 is one type. Different types of local waves, the conditions required to support local waves, requirements for coupling between an external wave and a local wave, and nonlinear effects are considered. The following section discusses various methods regarding the use of the invention as a modulator. Basic physical phenomena are first described, followed by specific embodiments based on metal-semiconductor-metal (MSM) and lateral p-i-n (LPIN) structures. Other potentially significant effects, such as heating and possible operating wavelengths, are also considered. The section on the use of the invention as a detector then follows. The last two sections are general illustrations of some applications of the invention and a list of references.

2. Local Waves

In this section, different types of local waves and the structures required to support them are first discussed, followed by requirements on grating couplers used to couple between an external wave and a local wave. Finally, nonlinear effects of the local wave are considered.

2.1 Types of Local Waves

Figure 3:
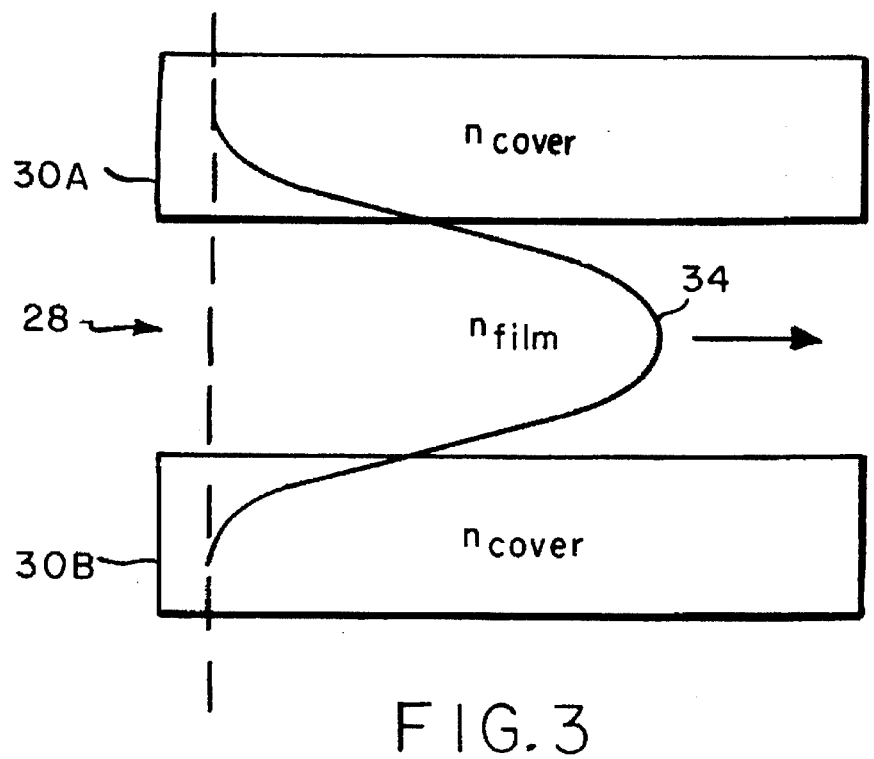
FIG. 3 is a cross section of a three-layer dielectric waveguide.

In an optical waveguide, light can propagate over extended distances within a confined region due to total-internal-reflection (TIR) or surface plasmon mode generation as described in [Tamir, 1979], the teachings of which are incorporated herein by reference. A three-layer dielectric which supports a TIR mode is shown in FIG. 3. The local wave propagates primarily in the film 28 as indicated by the arrow and the refractive index of the film 28 must be higher than that of both covers 30A, 30B in order for the local wave to be confined in the film. The name TIR refers to the ray trace model for local waves propagating in the film. In this model, rays which correspond to guided modes are incident at either film 28—cover 30A, 30B interface at greater than the critical angle and are totally internally reflected back into the film 28. The curve 34 illustrates a typical electric field for a low order TIR mode. The TIR mode is the mode associated with waveguides such as optical fibers, in which the core of the fiber corresponds to the film 28 of FIG. 3 and the cladding corresponds to the covers 30A, 30B.

Figure 4:
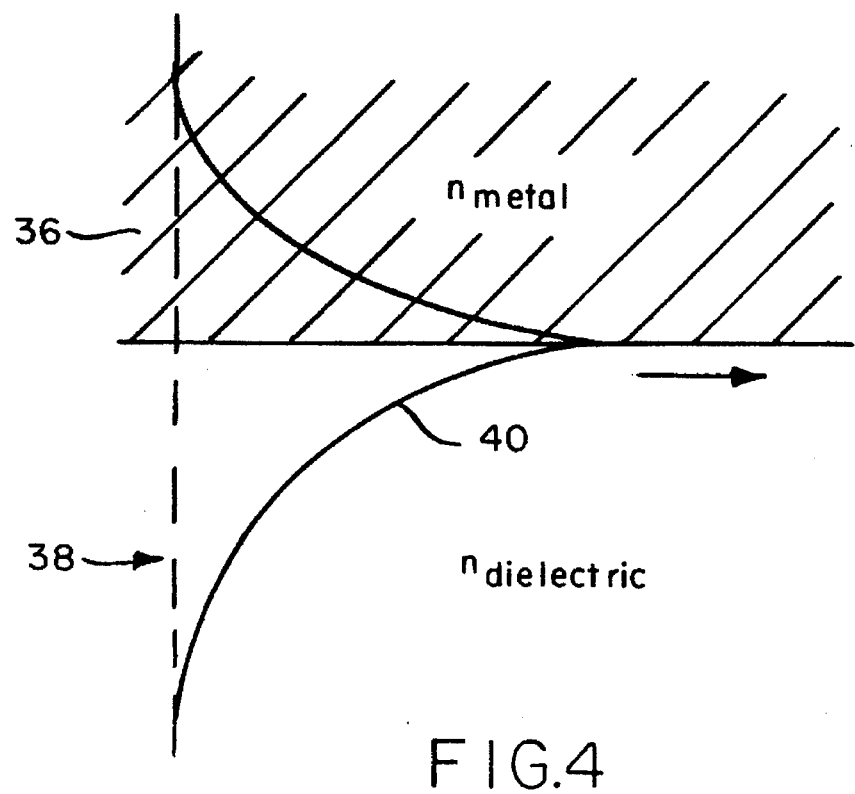
FIG. 4 is a cross section of a metal-dielectric waveguide.

Another type of local wave utilizes a surface plasmon mode (or TM surface-wave) to propagate optical energy as shown in FIG. 4. In this mode, the field propagates along a single interface between a metal 36 and a dielectric 38, as indicated by the arrow. The curve 40 illustrates a typical magnetic field profile for a surface plasmon. Properties of surface plasmons include high field localization and large propagation losses due mainly to absorption processes in the metal region. Preferred metals include aluminum, gold and silver. In order for a surface plasmon mode to exist, the metal and dielectric must satisfy the condition $$Re\{[\epsilon_m \epsilon_s/(\epsilon_m+\epsilon_s)]^{1/2}\} > Re\{\epsilon_s^{1/2}\} \quad (1)$$

where $\epsilon_m$ is the complex dielectric constant of the metal and $\epsilon_s$ is that of the dielectric. The surface plasmon oscillations supported by an electrode of the type shown in FIG. 1A will have somewhat different excitation conditions since the electrode is not a continuous sheet as is the metal 36 of FIG. 4. Nonetheless, the existence condition is similar in both cases.

Light may also be coupled to surface evanescent modes, and TIR, surface plasmon, surface evanescent modes or any combination of these types is appropriate for use in the current invention. However, in the preferred embodiments disclosed below, the local wave will be either a TIR or surface plasmon mode.

Since it is desireable to integrate electronic circuitry on the same substrate as the invention, candidate materials include group IV systems, III-V systems, and II-VI systems in general and silicon, silicon carbide, AlGaAs, and InGaAsP compounds in particular. The majority of embodiments will be discussed in the context of silicon. However, the invention is not limited to these materials and embodiments based on materials such as electro-optic materials, electro-optic polymers and related organic materials, or photorefractives are within the scope of this invention.

2.2 Waveguide Coupling

In the invention, the external wave is coupled to a local wave. In order to do this, the wavevector of the incident light, k, must be phase-matched with β, the real part of the propagation wavevector of the local wave. This is achieved by the grating and the phase-matching condition is $$\beta = k \sin\theta + 2\pi m/T \quad (2)$$

where θ is the resonant input coupling angle, T is the grating period, and m is an integer which represents the diffraction order coupled to the local wave. For example, the first order diffraction from the grating will couple to the waveguide if |m|=1 and the second order when |m|=2. In some applications, the light may be preferred to be normally incident to the electrodes with θ=0. In the current invention, the required grating is formed by the placement of the electrodes. Since the grating period will typically be on the order of a wavelength, the width of the electrodes will also typically be on the order of a wavelength. For example, in the near-infrared region, the electrode width will typically be on the order of several tenths of a micron.

While eqn. 2 is cast in terms of a grating of constant period, in reality, the coupling device may be aperiodic. For example, if the external wave is irregular in its intensity or phase profile, the electrodes lie on a non-planar substrate, or the required coupling efficiency varies with location, then the electrodes may be placed in a regular pattern which is not strictly periodic.

There is a symmetric relation between coupling into and out of a waveguide. To be more specific, a grating couples energy out of a waveguide as well as into it and this coupling is not 100% efficient. That is, it typically takes many interactions between a wave and a grating before a significant amount of the light is either coupled into or out of a waveguide. The coupling efficiency of the grating also depends on a number of other factors: the grating and waveguide geometry, the profile of the incident beam, and the indices of refraction of the materials involved to name a few. By varying any of these factors the coupling efficiency may be varied.

2.3 Nonlinear Effects

Related to the topic of grating coupling are effects imposed on the behavior of the system due to nonlinear processes. In the context of this invention, the primary nonlinear processes involve changes in refractive index due to free carrier density and/or temperature changes within a semiconductor-based material structure. These effects are described in [Prelewitz and Brown, 1994], the teachings of which are incorporated herein by reference. The nonlinear refractive index may be represented as $$n(N_c,T) = n0 + \Delta n_{NL}(N_c,T) \quad (3)$$

where $n_0$ is the linear refractive index, $N_c$ is the free-carrier density, T is the temperature, and Δn is the nonlinear contribution to the refractive index. Changes in $N_c$ and T are brought about primarily by optical absorption or by carrier injection.

The propagation index β in both the three-layer and the two-layer waveguide structures of FIGS. 3 and 4 depend strongly on the refractive index of the film 28 or dielectric 38, respectively. Given the nonlinear nature of the coupling structure, a more accurate representation of the phase-matching condition of eqn. 2 would be $$\theta(\Delta n_{NL}) = \sin^{-1}[\Delta n_{NL}] + 2\pi m/T] \quad (4)$$

Figure 5A:
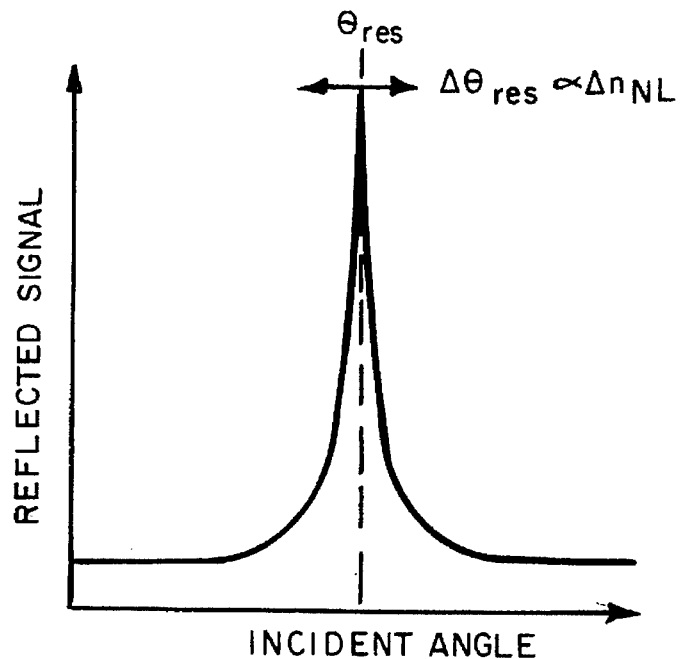
FIGS. 5A–5B are graphs of reflected signal versus incident angle illustrating resonant detuning.
Figure 5B:
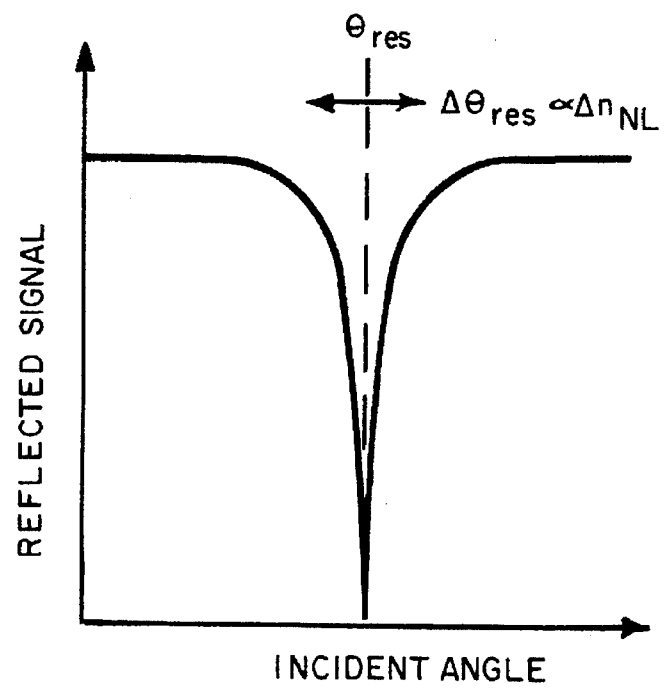

Therefore, changes in θ due to nonlinear changes in the refractive index directly affect the phase matching condition. FIGS. 5A–5B illustrate this by plotting the strength of a reflected wave versus the incidence angle θ. FIG. 5A illustrates a device designed for maximum reflectivity at resonance, while FIG. 5B is a device designed for minimum reflectivity. At the resonance angle $\theta_{res}$, energy couples from the external wave into the local wave, resulting in a redistribution of energy amoung the various waves and a change in the strength of the reflected wave. The nonlinear shift in θ is approximately proportional to the change in index Δn.

In addition to the nonlinear detuning effects imposed on the resonance, a nonlinear refractive index can also lead to interference effects in the coupling region of the waveguide. Typically, the external field does not couple into the local wave at only one point Instead, coupling takes place over a relatively broad region (compared to the grating period) of the grating in the direction of propagation of the local wave. Therefore, given the spatial nature of the coupling process, there is also a spatial dependence when considering the nonlinear effects. Assuming this, the nonlinear propagation wavevector can be written as $\beta(z)=\beta[\Delta n_{NL}(z)]$, where z is taken as the direction of propagation of the local wave. Hence, at each point in the z-direction along the grating, the coupled light has a different phase relation that is dependent on the nonlinear term of the refractive index. In addition to the initial coupled phase term, each spatial component of the local wave accumulates a propagation phase term relative to the coupled incident field. As a result, for any given point along the propagation path, interference effects between the propagating local wave and the coupled incident field can take place if the phase difference is large enough. Any light coupled out of the waveguide may experience either constructive or destructive interference over the coupling region, corresponding to either a high or a low measured reflectivity along the propagation path.

While both nonlinear coupling effects described above (resonant detuning and traveling-wave interference interactions) may be used in the invention, the invention is not limited to these effects. For example, one embodiment may use electro-optic materials to fill the spaces between the electrodes. As the voltage between the electrodes is varied, so will the refractive index of the electro-optic material and the coupling efficiency of the grating formed by the electrodes and the material. Furthermore, the electrodes themselves may be transparent (e.g., indium tin oxide) and so the grating coupler may be a phase grating rather than a metal grating. While it is intended that these embodiments lie within the scope of the invention, the preferred embodiments described herein will rely on resonant detuning.

3. Modulation

This section considers the operation of the invention as an optical modulator. The basic operation is further discussed and then two specific embodiments, one based on metal-semiconductor-metal structures and the other based on lateral pin diodes, are disclosed. Although the discussion is in the context of modulators, those skilled in the art will recognize that the teachings are not limited to modulators. For example, they may be applied also to the invention used as a detector.

3.1. Basic Physical Mechanisms

In preferred embodiments of the invention which are used as modulators, the modulation of the output wave is effected by varying a voltage placed across adjacent electrodes which, in turn, results in a refractive index change in the wave guiding structure. This then results in a change in the coupling between the external wave and the local wave via the processes described in 2.3 and a subsequent modulation of the output wave.

In general, the physical mechanism underlying the modulation does not have to depend on a refractive index change. The absorption coefficient or birefringence of the device are two common alternate optical parameters which may be used. Furthermore, in the preferred embodiment, the applied voltage changes the refractive index primarily via the free-carrier plasma effect. The invention is not limited to this effect and an electric field may be used to change the optical properties of a material by any of the following mechanisms to name a few: the Pockels effect, the Kerr effect, the Franz-Keldysh effect, the quantum confined Stark effect, and band-filling.

For the preferred embodiment with a silicon substrate, the free-carrier plasma effect is used. This is an electrorefraction process by which the refractive index is modified by the introduction of free carriers. The carriers are normally introduced either by direct current injection via the electrodes or by photogeneration of carriers in a semiconductor material. The change in index is then induced due to plasma interactions between the carriers and the optical field. This mechanism is suitable for both direct and indirect bandgap materials, including silicon.

3.2 MSM Devices

A preferred embodiment of the invention relies on metal-semiconductor-metal (MSM) structures. Referring to FIG. 1, if the electrodes 12 are metal and the substrate 14 is a semiconductor, then FIG. 1 depicts such a device. In the preferred embodiment, the substrate 14 is silicon. If the transmitted wave 20 is the desired output wave, then the substrate 14 may be replaced by a silicon membrane in order to reduce the attenuation of the transmitted wave 20. As described in section 2, the electrodes 12 are spaced so as to couple the external wave 10 to the local wave 16, which is a surface plasmon in this specific configuration, and the coupling efficiency is varied by varying the refractive index according to the nonlinear effects described in section 2.3.

More specifically, as shown in eqn. 3, the change in nonlinear refractive index for a semiconductor is a function of both carrier density and temperature. Each of these contributions can be separated out so that $$\Delta n_{NL}(N_c, T) = \Delta n_C + \Delta n_T \quad (4a)$$

where $\Delta n_C$ is the refractive index change due to the carrier concentration and $\Delta n_T$ is the change due to temperature. Using Drude's theory to model the carrier dynamics, the electronic contribution to the refractive index may be modelled via Drude's model as described in [Blakemore, 1985], the teachings of which are incorporated herein by reference. The refractive index then has the form $$\Delta n_C = N_c(-8.9 \times 10^{-22} \text{cm}^3) \quad (5)$$

Experimentally, it has been shown that the thermal contribution can be approximated by $$\Delta n_T = (T - 300K)(2 \times 10^{-4} K^{-1}) \quad (6)$$

See [Sauer, et. al., 1988], the teachings of which are incorporated herein by reference. However, in the preferred embodiments, it is desireable to minimize thermal effects for several reasons. First, the thermal processes are typically much slower in their response times than the electronic effects. Second, eqns. 5 and 6 have opposite signs and tend to cancel each other when both are present. Hence, to design a fast and efficient optical switching system, the effects due to temperature should be minimized.

Concentrating on the electronic effects predicted by the Drude theory, there are two ways in which the carrier density can be modified in the MSM structure. They include either carrier-injection or carrier generation via optical absorption.

If the interior of the semiconductor region is assumed to be ohmic, then the result of carrier-injection (or injected-current) can be modeled by Ohm's law which states $$J = \sigma E, \quad (7)$$

where J is the internal current density, E is the internal electric field, and $\sigma$ is the conductivity which is proportional to the carrier concentration $N_c$. At any given instant in time, carriers are injected into the semiconductor region between the electrodes resulting in a change in the refractive index as predicted by Drude's theory.

The other method uses the semiconductor's absorption properties to generate carriers. If the incident optical energy is equal to or larger than the semiconductor's bandgap, then electrons in the valence-band can absorb sufficient energy to be transported into the conduction band. The tree-carrier concentration may be changed either by changing the strength of the incident light or, as is the case in the preferred embodiment, by changing a voltage applied across the electrodes to sweep carriers out of the semiconductor region. One absorbed photon creates one free electron-hole pair. The absorption process for direct bandgap semiconductors such as GaAs is a one step process, while the process for semiconductors with indirect bandgaps such as Si requires two steps. In indirect bandgap materials, the absorbed photons do not provide a change in momentum, and a second process is required to transfer excited electrons into the conduction band. This usually involves the emission of a lattice phonon. Due to the second absorption step, resonant absorption in indirect bandgap semiconductors is typically much smaller than semiconductors with direct bandgaps.

One advantage of the photoabsorption approach over the direct current injection approach is that photoabsorptive devices will potentially require less power since the energy to create the free carriers comes from the incident light and not from current generated by the device itself.

3.2.1 Electronic Properties

Figure 6A:
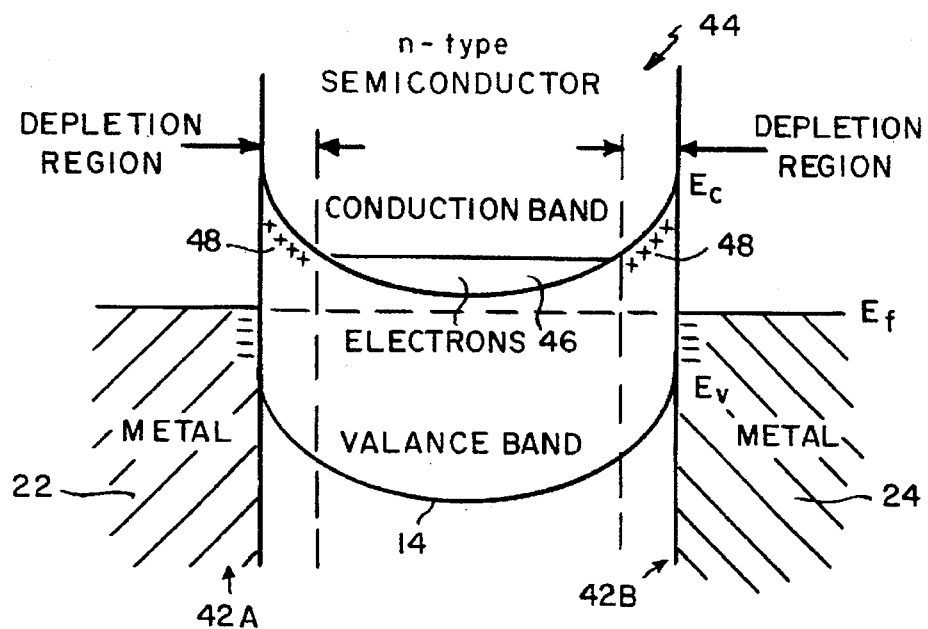
FIGS. 6A–6B are energy diagrams for a metal-semiconductor-metal device.

The preferred method of varying the carrier concentration may be understood by considering the electronic properties of the semiconductor-metal interface. FIG. 6A is a simplified one-dimensional model of the electronic state of the MSM device of FIG. 1. The fingers 22, 24 and the semiconductor 14 form two interfaces 42A, 42B. At each interface 42A, 42B, a depletion region forms, which is known as a Schottky barrier. FIG. 6A illustrates this in the energy diagram 44 of the MSM structure with zero-bias. Here, $E_c$ is the semiconductor conduction band energy level, $E_v$ is the semiconductor valence band energy level, and $E_f$ is the Fermi energy level for both the metal 22, 24 and the semiconductor 14 at zero-bias. For n-doped semiconductors, excess carriers migrate into the metal region due to lower energy states in the metal. As the carriers vacate, the charge imbalance between the regions generates an electric field that eventually suppresses all current flow. This forms the basis of the Schottky barrier. If the barrier is large enough, and if there is no incident light, current flow is suppressed even when an applied bias voltage is present. Hence, a Schottky barrier behaves electrically like a diode. This property is what allows it to be used as an optical detector or modulator.

Figure 6B:
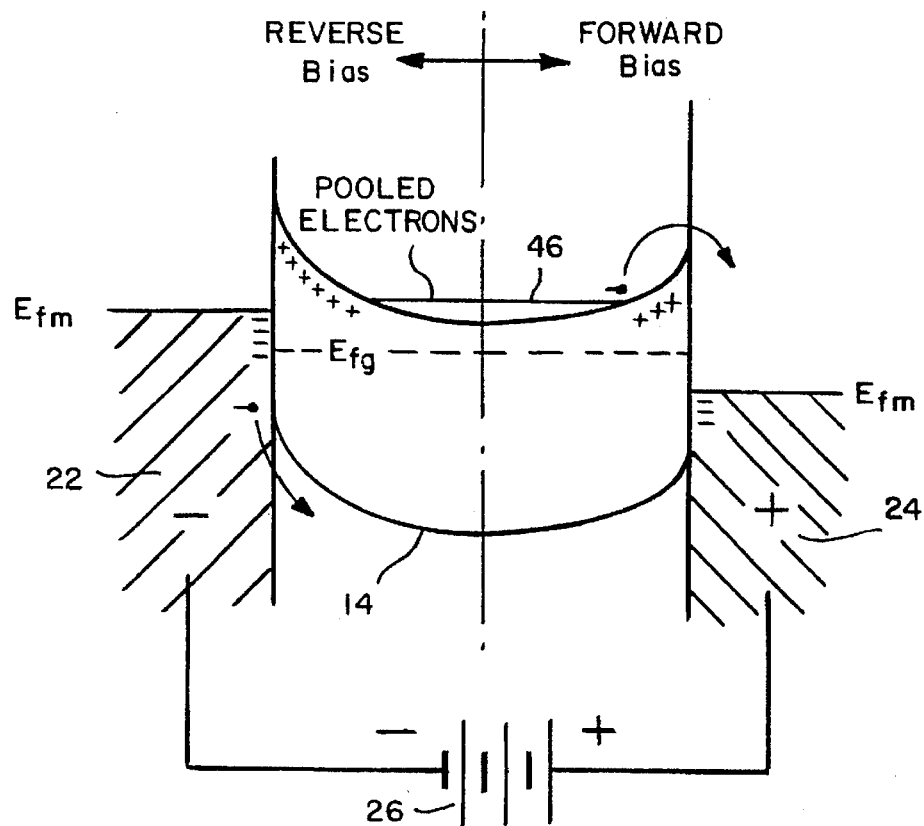

As discussed previously, energetic photons absorbed in semiconductors will generate free-carriers. In an MSM structure with zero-bias, the generated free-electrons 46 tend to accumulate in the semiconductor region between the metal electrodes 22, 24. This occurs due to the symmetric bending of the conduction band at the semiconductor-metal interface. Generated holes 48 on the other hand tend to migrate towards the interface 42A, 42B due to valence band bending. In the preferred embodiment, the pooled free-carriers are swept from the semiconductor region, thus changing the carrier density and leading to a corresponding change in refractive index. The sweeping is achieved by applying a bias 26 across the metal electrodes 22, 24 of the MSM structure, as shown in FIG. 6B. Here, $E_{fs}$ and $E_{fm}$ are the Fermi energy levels for the semiconductor and metal regions, respectively. As shown, one interface of the structure is reversed biased while the other is forward biased. The bias voltage shifts the respective Fermi energy levels at each interlace. This results in a tilting of the conduction energy band allowing the electrons 46 to spill out through the forward biased region, thus changing the carrier concentration.

The process described above is for modulating light using optical absorption to induce refractive index changes. It does not cover carrier-injection. However, carrier-injection modulation is conceptually a simpler process to describe. To modulate with injected carriers, the bias 26 is made large enough to overcome the Schottky barrier potential. This results in an increased current flow through the semiconductor region 14, which correspondingly changes the instantaneous carrier density and coupling properties. However, this method of modulation would typically be reserved for MSM structures having small Schottky barrier contact potentials. That is, the metal-semiconductor interfaces 42A, 42B should be ohmic contacts.

As a final observation, it should be noted that the metal electrodes 12 serve two purposes. First, they serve an optical function in that they couple the external wave 10 to the local wave 16 and also Ibm a structure which supports the local wave 16. Second, they serve an electrical function in the formation of the Schottky barrier 42A, 42B and the application of a bias to the barrier. A single metal may not be ideal for both functions and so the electrodes 12 may have a composite structure. For example, gold is a preferred metal for the support of surface plasmons. However, it does not form a good Schottky barrier, while tungsten does. Therefore, the electrodes 12 may consist of a tungsten layer in contact with the silicon 14 in order to form the barrier followed by a gold layer in contact with the tungsten in order to support the surface plasmon 16. In general, the electrodes and the underlying structure may be even more complex, including the use of doped semiconductor regions, quantum well structures, superlattice structures, and transparent conductors such as indium tin oxide. For example, quantum wells and quantum wires may be used in the semiconductor region 14 in order to increase the effective carrier density and enhance the field-induced change in refractive index.

3.2.2 Cover Material

Figures 7A, 7B, 7C:
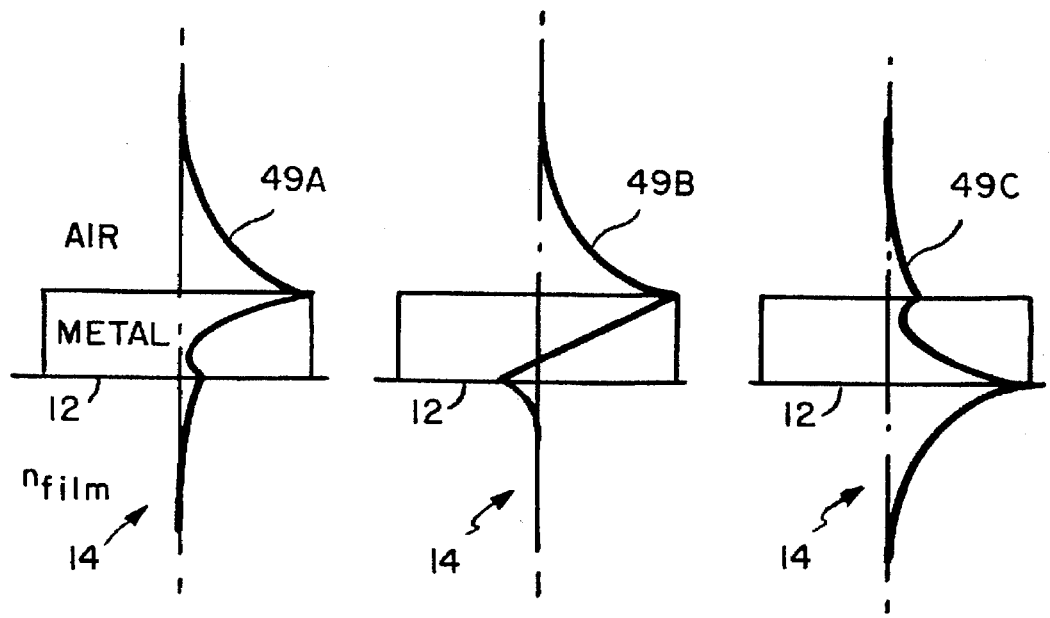
FIGS. 7A–7C are illustrations of plasmon mode profiles in an asymmetric device.
Figures 7D, 7E:
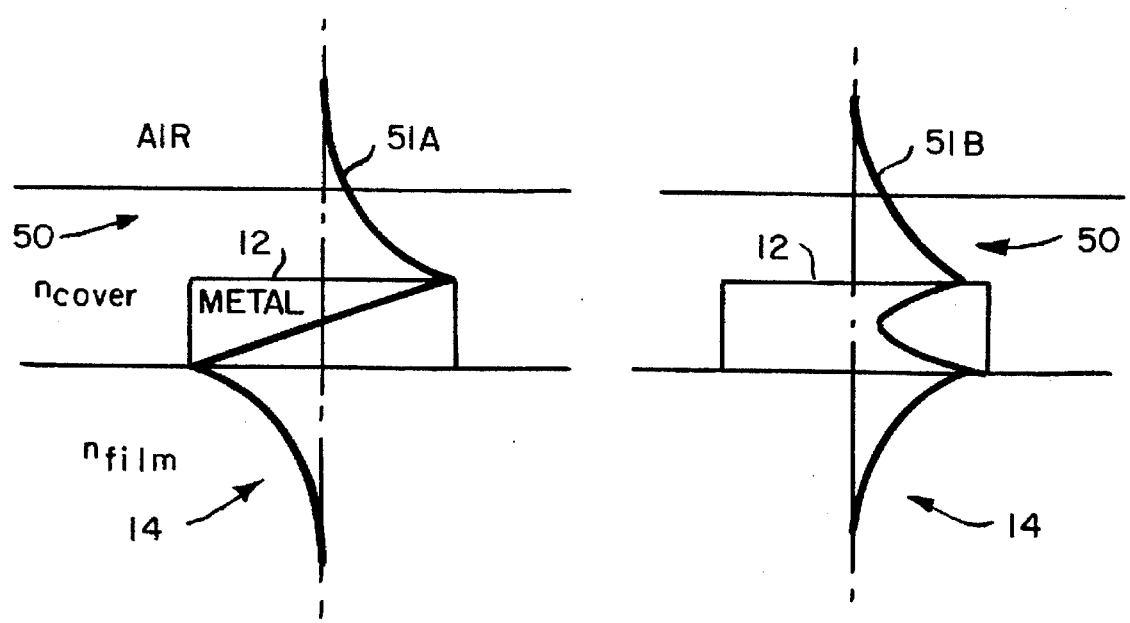
FIGS. 7D–7E are illustrations of plasmon mode profiles in a symmetric device.

The MSM structure of FIG. 1 is highly asymmetric. In essence, there is a large refractive index gradient between the air, which may generally be considered a cover layer, and the metal 12 and semiconductor 14 layers. As a result, the cover coupling efficiency into the structure can be poor as illustrated in FIGS. 7A–7C, which show the profiles of three possible surface plasmon modes 49A, 49B, 49C. In the MSM structure there are two interfaces where plasmons are generated. One is at the semiconductor 14—metal 12 interface and the other is at the air—metal 12 interface. For the asymmetric structure, there is very little overlap between the plasmon modes of the two interfaces. This results in a low energy exchange between the modes, and poor cover-coupling into the semiconductor 14 -metal 12 plasmons. Since the switching processes utilized in the preferred embodiment occur within the semiconductor region 14, an improvement in the overlap between the plasmon modes will result in improved device performance. In the preferred embodiment, this is accomplished by symmetrizing the structure by depositing a layer 50 as a cover. The cover 50 is chosen to have a refractive index approximately equal to the semiconductor layer 14. Preferred materials include amorphous and poly-crystalline silicon although materials are not limited to these choices. Other dielectrics, thin films and even organic materials may also be used. This creates a buried electrode-coupling structure, as shown in FIGS. 7D–7E. The additional layer improves the plasmon mode overlap, as illustrated by the mode profiles 51A, 51B, resulting in better cover-coupling into plasmons generated at the semiconductor 14 -metal 12 interface. Although the use of a cover material is illustrated in the context of the MSM embodiment, it should be understood that this general principle may be applied to other embodiments as well.

3.2.3 Multi-layer Devices

Figure 8:
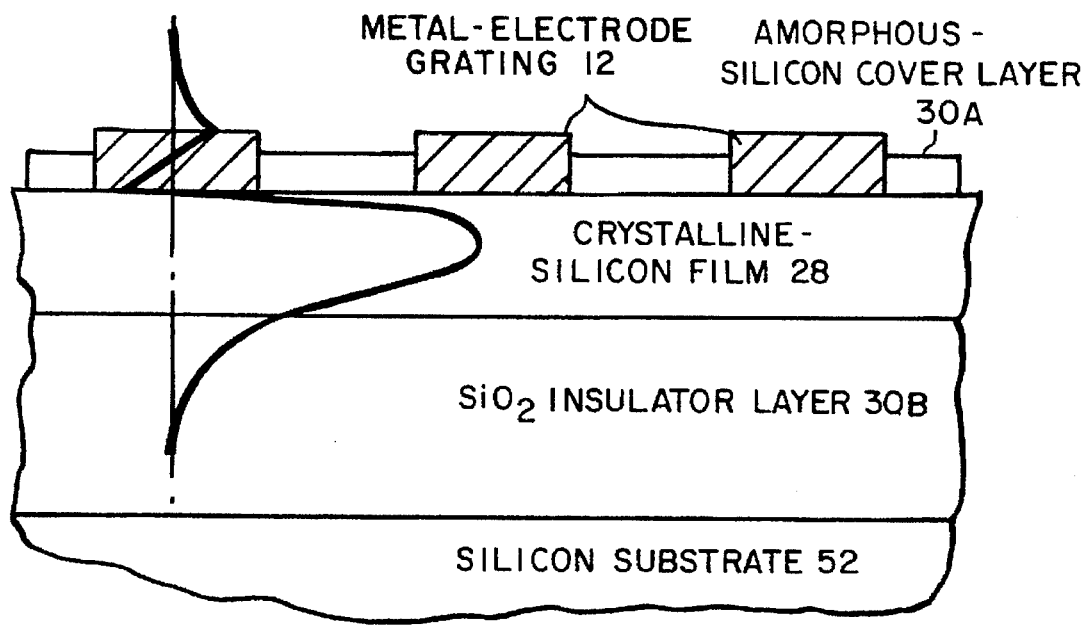
FIG. 8 is a cross section of another embodiment of the invention.

Although the invention has been discussed in the context of a metal electrode on a bulk semiconductor substrate, it is not limited to this configuration. An alternate embodiment involves using a three-layer dielectric waveguide structure as illustrated in FIG. 8. The structure is similar to that depicted in FIG. 3, and many material systems may be used to fabricate the structure. However, silicon-on-insulator (SOI) structures are preferred due to their ease of fabrication and the tight confinement of the local wave which results from their use. The SOI structure has a number of different variations, which include silicon-on-sapphire, separation by implanted oxygen, bonded and etch-back SOI (BEB-SOI), and poly-crystalline SOI. BEB-SOI has been shown to possess good waveguiding properties. [Evans and Hall, 1991], the teachings of which are incorporated herein by reference. In a preferred embodiment of FIG. 8, the TIR wave is supported by an amorphous silicon cover 30A, a crystalline silicon film 28 and a silicon dioxide insulating layer 30B. Metal electrodes 12 are used for coupling and electrical functions. The entire structure is on a silicon substrate 52.

The three-layer structure of FIG. 8 has several advantages over a bulk structure such as that of FIG. 1. It provides faster switching since generated or injected carriers are restricted to a narrower region of the semiconductor 28. In the bulk case, carriers can extend far from their point of origins, resulting in a lagging of the tail-end switching response. Second, both plasmons and TIR waveguide modes may exist in the structure. The simultaneous excitation of both modes can lead to more efficient modulation. Compared to surface plasmons, TIR modes occur deeper within the semiconductor layer. As a result, more free-carriers are liberated to affect the refractive index. In addition, when the structure is brought into resonance during its low-reflectivity-state (off-state), more energy may be coupled into the structure due to the added effect of both modes. There are also some disadvantages to the three-layered MSM waveguide structure. The structure is obviously more complex, both to design and to fabricate. Additional leakage current due to a non-perfect insulator 30B could result in added heating of the structure.

Figure 9A:
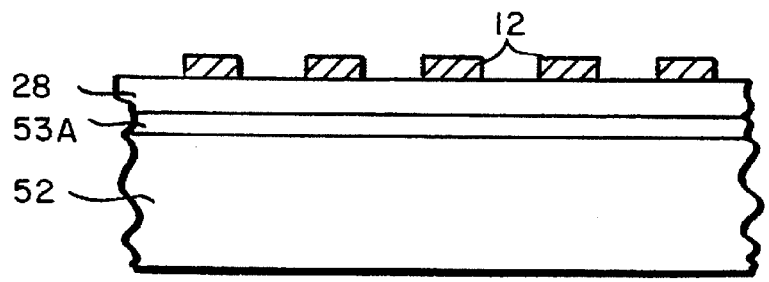
FIG. 9A–9B are illustrations of further embodiments of the invention.
Figure 9B:
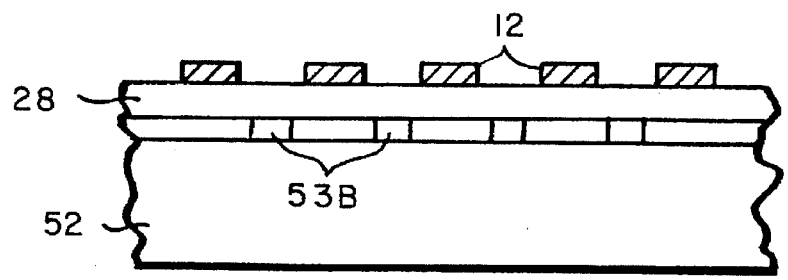

In the alternate multi-layer structures of FIGS. 9A–9B, quantum well geometries may be used to increase the effective carrier density and enhance the field-induced change in refractive index. In FIG. 9A, the insulating layer 30B of FIG. 8 is replaced by a quantum well structure 53A. In FIG. 9B, quantum wires 53B are used instead. Normal electroabsorption requires that the applied field be directed across the quantum well, which is impractical in the embodiments of FIGS. 9A–9B. However, it is possible to make use of conduction along the quantum well in order to increase the effective current density associated with carrier injection. This would result in far lower injection currents. III–V systems such as AlGaAs and group IV systems such as SiGe or SiC are preferred material systems for such an embodiment.

Many other variations of multi-layer structures will be apparent to those skilled in the art.

3.3 LPIN Device

Figure 10:
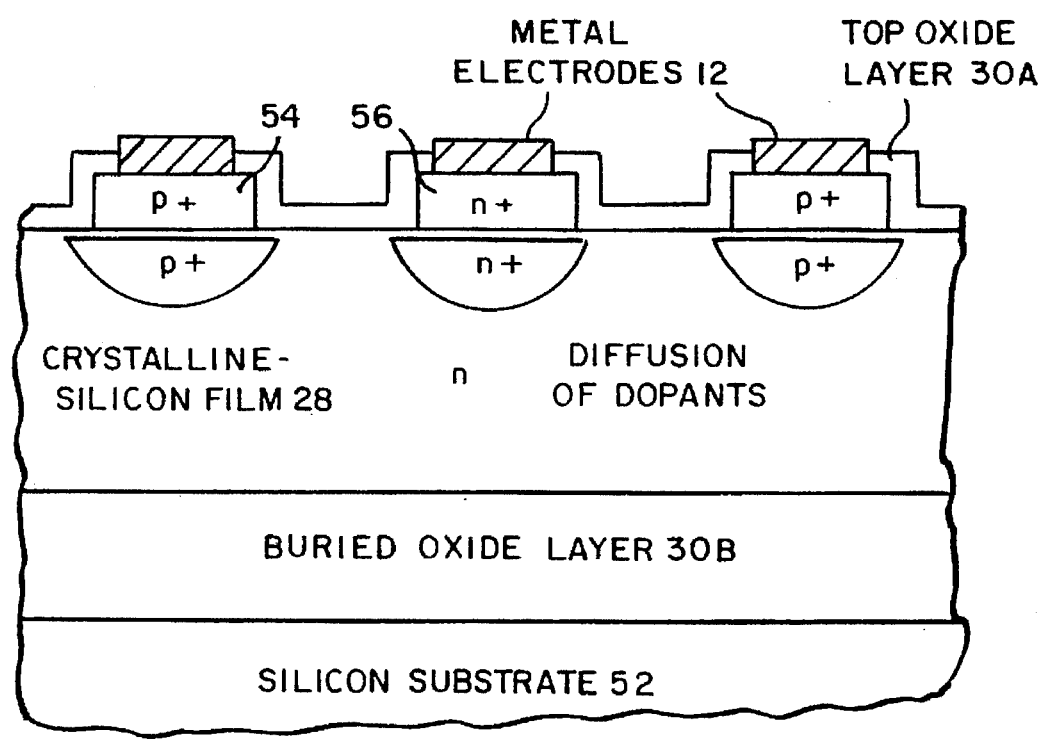
FIG. 10 is a cross section of yet another embodiment of the invention.

An alternate preferred embodiment is shown in FIG. 10. The crystalline silicon film 28 and buried oxide layer 30B on the silicon substrate 52 are similar to the SOI structure of FIG. 8. However, the remainder of the structure is more complex. The metal electrodes 12 are separated by a top oxide layer 30A and alternately contact p+ and n+ doped regions 54, 56, thus forming a lateral periodic series of PIN diodes (also known as a LPIN structure) on a silicon-on-insulator (SOI) structure. The doped regions may be formed by deposition, diffusion or a combination of the two. With a modest reverse bias voltage, the depletion region extends fully between the p+ and n+ diffusion regions 54, 56. A feature of the design is the buried oxide region 30B. This attribute prevents the generation of deep carriers during the absorption process, which would otherwise limit the bandwidth of the device.

One advantage of this design over MSM is the high quality junctions that exist at the n+–n and p+–n diffusion interfaces. Since the base materials are all silicon, there are fewer defects and dislocations at the boundaries. This results in lower leakage and longer free-carrier lifetimes. In the preferred embodiment, the PIN diodes are operated in forward bias and modulation of the refractive index is achieved by current-injection.

Like the MSM device, the electrodes 12 of the LPIN can act as a waveguide coupler. However, it is difficult for the LPIN structure to utilize optical-plasmon interactions due to the lack of metal surfaces within the depletion region. However, since the structure is in the form of a three-layer dielectric (SOI), TIR waveguide modes could be used instead. To improve the cover-coupling efficiency of the structure, a high-index cover layer may be added as discussed previously.

3.4 Miscellaneous Considerations

In addition to the optical coupling and electronic operation of the device, several other considerations are worth mentioning.

3.4.1 Thermal Characteristics

As shown in eqn. 4, the total change in index is the sum of both electronic and thermal processes. One main consideration when designing any kind of optoelectronic structure is the impact of device heating. As pointed out previously, thermal effects have a much slower response time compared to electronic processes. As a result, if the dominant physical effect is thermal, the modulation switching speed can be seriously degraded. Another problem exists due to the opposite signs of the thermal and electronic effects. Since the total index change is the sum of these two quantities, thermal index changes tend to cancel out the electronic index changes. Typically, thermal changes should be minimized. Standard methods include the use of heat sinks or active coolers with feedback loops to maintain the thermal stability of a device.

One source of heating is the nonradiative recombination of generated electron-hole pairs in the semiconductor region. When optical energy is absorbed, creating pairs of electrons and holes, the individual particles migrate in directions according to the local field distribution. The generated particles can be used in either modifying the refractive index for modulation or generating a photo-current for detection. However, if the electron-hole pairs recombine nonradiatively before their properties can be used, the stored energy is given up to the semiconductor lattice in the form of heat. It should be noted that indirect bandgap semiconductors have no allowed radiative transitions, which means that all tree-carriers must decay nonradiatively. However, the carriers can be swept from the interaction region with an applied electric field before recombination takes place, thus reducing the heating effect.

A second source of heat is Joule heating which arises from a semiconductor's resistance to current flow. When current passes through a material, inelastic collisions occur between the flowing electrons and the lattice. This generates heat throughout the material. Joule heating occurs for both current-injection and photo-generation cases. However, assuming equivalent electronic effects, Joule heating from current-injection is the more prominent of the two. When free-carriers are photo-generated, they are trapped inside a potential well with no net current flow and hence no Joule heating. Current flows only when a field is applied across the region of generation. Hence, the photo-generated carriers experience a shorter resistive path during the sweeping process resulting in less heat generation.

One method that may be employed in combating the temperature effects, is balancing the thermal generation processes during the on- and off-states (or high- and lowreflectivity-states) of the modulator. In essence, it should be possible to achieve a thermal pseudo-steady-state, thus eliminating time-dependent temperature effects.

This process of balancing the temperature during the on/off-states is applicable to the MSM-modulator concept utilizing photo-generated carriers. Unlike the current-injected modulator, a large density of photo-generated carriers exists within the structure during the on-state. As we pointed out earlier, the generated free-carriers recombine nonradiatively due to current leakage, thus, heating the lattice. During the off-state of the modulator, current flows through the structure causing Joule heating. Therefore, if the amount of heat generated from recombination and current flow are equal, then time-dependent thermal effects are minimized.

3.4.2 Wavelength of Operation

The wavelength range over which the modulator will function is another important consideration. For the preferred embodiment based on silicon, the optical absorption is approximately 11 cm$^{-1}$ at a wavelength of 1.06 µm. At this wavelength at room temperature, the photon energy is approximately equal to the bandgap energy of silicon (1.12 eV). If the wavelength becomes longer than this, then the absorption rapidly decreases. At shorter wavelengths, the absorption increases rapidly. The absorption curves are different for crystalline, poly-crystalline, and amorphous silicon. Amorphous and poly-crystalline silicon are mentioned since they may be used as cover materials to symmetrize the structure. As the absorption increases with shorter wavelengths, the rate of free-carriers generation in silicon also increases. Therefore, in embodiments which rely on the photo-generation of carriers, operation of the device at shorter wavelengths may improve the modulation strength of the device.

4. Detectors

Embodiments which are used as detectors largely rely on similar phenomena as those which are used as modulators. For example, a modulator may be thought of as a device which controls the coupling between the external wave and the local wave by varying the voltage across the electrodes. This is achieved because varying the voltage affects the number of tree carriers produced in the semiconductor waveguide, and the number of carriers affects the coupling by changing the refractive index of the waveguide via one of the electrorefractive processes. In short, the electrical state of the electrodes affects the number of carriers which affects the coupling of light. A reversal of this chain—light affects the number of carriers which affects the state of the electrodes—roughly describes the detection process. The device is configured to maximize the coupling of the external wave to the local wave. The maximum strength local wave then produces carriers in the semiconductor material which are sensed through the electrodes. Hence, many of the teachings for modulators are directly applicable to detectors also and the embodiments, including the preferred ones based on the MSM and LPIN structures, may be used as detectors. The following sections highlight only the differences between embodiments intended to be used as detectors and those intended to be used as modulators.

4.1 Wavelength of Operation

In the modulator, the absorption characteristic of the device determines the number of free carriers generated by photoabsorption. However, in cases of weak absorption, tree carriers can be generated by the alternate process of direct injection. In the case of detection, this is not so. The device is restricted to wavelengths for which the device absorbs the incident radiation and stronger absorption translates directly to a more sensitive detector. It should be noted that the absorption process is not restricted to transitions from the valence band to the conduction band of the semiconductor. For example, absorption may take place via a transition from the metal Fermi level to the conduction band of the semiconductor.

4.2 Detection Mechanism

The invention of the current device lies in the dual use of the electrode structure. The electrodes optically couple light from the external wave to the local wave and the strength of this local wave is then electrically sensed via the electrodes. The optical coupling results in a field which is enhanced with respect to conventional, uncoupled detectors, and the subsequent sensing of this field may be achieved by any of the commonly used photodetection methods, including approaches based on photodiodes, photoconductive devices and photovoltaic devices.

As explained previously, in the MSM approach, the double Schottky barrier forms a pool of carriers and the application of a voltage bias then tips this pool producing a current flow. In the detector application, the voltage bias may be applied and the resulting current flow, which is indicative of the strength of the external wave, may be sensed thus detecting the strength of the optical field. Alternately, if the Schottky barrier is low (i.e., the metal-semiconductor contacts are essentially ohmic), then the resistance of the semiconductor will be determined by the strength of the optical field and the device may be operated as a photoconductor.

In the case of the LPIN structure, the device may be operated as a conventional photodiode, either in the photoconductive or the photovoltaic mode. In the photoconductive mode, the pin junction may be reverse biased and the strength of the external field determined by sensing the current which flows through adjacent electrodes. In the photovoltaic mode, no voltage is applied across the electrodes. Instead, the voltage resulting from carriers generated by the external wave is sensed, thus indicating the strength of the external wave.

5. General Illustrations

Figure 11A:
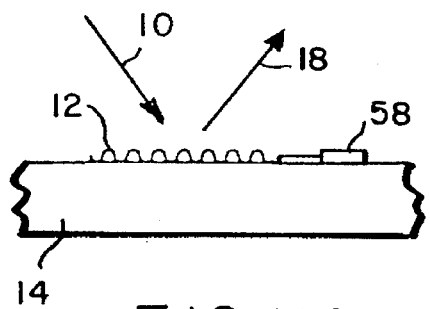
FIG. 11A is an illustration of the invention used as a reflective modulator.
Figure 11B:
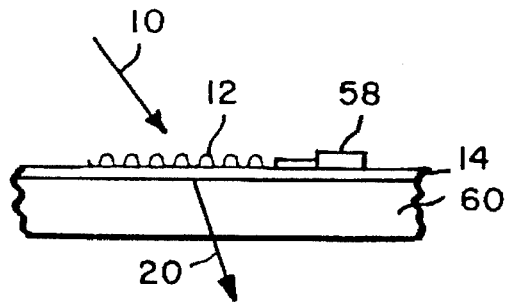
FIG. 11B is an illustration of the invention used as a transmissive modulator.
Figure 12:
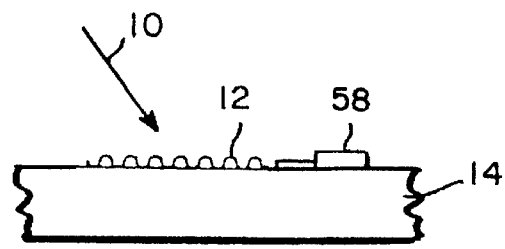
FIG. 12 is an illustration of the invention used as a detector.

A general illustration of the invention used as a modulator is shown in FIGS. 11A–11B: while FIG. 12 depicts the invention as used as a detector. In FIG. 11A, the invention is used in a reflective mode. The external wave 10 is incident on the grating/electrodes 12 and the strength of the reflected wave 18 may be varied as disclosed previously. In many of the discussed embodiments, the electrodes 12 lie on a silicon substrate 14 so conventional circuitry 58 may also be integrated on the same substrate 14. This circuitry 58 may be used to drive the electrodes 12 thus varying the strength of the reflected wave 18. Due to the use of standard techniques in fabricating both the modulator and the circuitry, many modulators or arrays of modulators may be fabricated on a single substrate. FIG. 11B shows a device used in transmission. In this case, the transmitted wave 20 is the wave of interest which is modulated. If the light lies in a part of the spectrum for which silicon is highly absorptive, it may be necessary to thin the silicon 14 or to use a silicon membrane for the device and the circuitry 58. Structural support may be achieved by using a glass or other transparent substrate 60.

In FIG. 12, the device is used to sense the strength of the external wave 10. In this case, no waves are actively being modulated. Rather, the optical field of the wave 10 produces an electrical effect which is sensed by the circuitry 58 via the electrodes 12. The circuitry may also incorporate more sophisticated functions such as local averaging, edge detection and background corrections.

6. References

[Alexandrou, et. al., 1993] Alexandrou, S., et. al., "A 75 GHz Silicon Metal-semiconductor-metal Schottky Photodiode," *Applied Physics Letters*, 62, 2507 (1993).

[Alferness, 1982] Alferness, R. C., "Waveguide Electrooptic Modulators," *IEEE Transactions on Microwave Theory and Techniques*, MTT-30, 1121 (1982).

[Bassous, et. al, 1991] Bassous, E., et. al., "A high-speed Silicon Metal-semiconductor-metal Photodetector Fully Integrable with (Bi)CMOS Circuits," *International Electron Devices Meeting 1991, Technical Digest*, 187–190 (1991).

[Blakemore, 1985] J.S. Blakemore, *Solid State Physics*, 2nd ed., Cambridge: Cambridge University Press, 157–169 (1985).

[Brueck, et. al, 1985] Brueck, S. R. J., et. al., "Enhanced Quantum Effiency Internal Photoemission Detectors by Grating Coupling to Surface Plasma Waves," *Applied Physics Letters*, 46, 915 (1985).

[Bryan-Brown, et. al., 1991] Bryan-Brown, G. P., et. al., "Coupled Surface Plasmons on Silver Coated Gratings," *Optics Communications*, 82, 1 (1991).

[Caldwell and Yearman, 1991] Caldwell, M. E. and Yearman, E. M., "Recent Advances in Surface Plaxnon Spatial Light Modulators," *SPIE Proceedings: Optics for Computers-Architectures and Technologies*, 1505, 50 (1991).

[Campbell, 1993] Campbell, P., "Enhancement of Light Absorption from Randomizing and Geometric Textures," *J. Opt. Soc. Am. B*. 10, 2410 (1993).

[Chou and Liu, 1992] Chou, S. Y., and Liu, M. Y., "Nanoscale Tera-Hertz Metal-Smiconductor-Metal Photodetectors," *IEE J. Quantum Electronics*, 28, 2358 (1992).

[Collins, et. al., 1990] Collins, R. T., et. al., "Optical Modulator," U.S. Pat. No. 4,915,482 (Apr. 10, 1990).

[Delort and Maystre, 1993] Delort, T., and Maystre, D., "Finite Element Method for Gratings," *J. Opt. Soc. Am. A*. 10, 2592 (1993).

[Evans and Hall, 1991] Evans, A. E., and Hall, D. G., "Propagation Loss Measurements in Silicon-on-Insulator Optical Waveguides formed by Bond-and-Etchback Process," *Applied Physics Letters*, 59, 1667–1669 (1991).

[Evans and Hall, 1990] Evans, A. E., and Hall, D. G., "Measurement of the Electrically Induced Refractive Index Change in Silicon for Wavelength λ=1.3 μm using a Schottky Diode", *Applied Physics Letters*, 56, 212 (1990).

[Ghioni, et. al., 1994] Ghioni, M., Kesan, V. P., and Warnock, J. D., "A High-speed VLSI-compatible Photodetector for Optical Data Link Applications," private communication (1994). [Hammer, et. al., 1973] Hammer, J. M., et. al., "Fast Electro-optic Waveguide Deflector Modulator," *Applied Physics Letters*, 23, 176 (1973). [Klingenstein, et. al., 1992] Klingenstein, M., et. al., "Ultrafast Metal-semiconductor-metal Photodiodes Fabricated on Low-temperature GaAs," *Appl. Phys. Lett.*, 60, 627 (1992). [Lentine, et. al., 1989] Lentine, A. L., et. al., "Symmetric Self-Electrooptic Effict Device: Optical Set-Reset Latch, Differential Logic Gate, and Differential Modulator Detector," *IEEE J. Quantum Electronics*, 25, 1928 (1989). [Magnusson and Wang, 1993] Magnusson, R., and Wang, S. S., "Optical Guided-mode Resonance Filter," U.S. Pat. No. 5,216,680 (Jun. 1, 1993). [Mayer and Lau, 1990] Mayer, J. W., and Lau, S. S., *Electronic Materials Science for Integrated Circuits in Silion and Gallium Arsenide*, New York: McMillan (1990). [Maystre, et. al., 1978] Maystre, D., et. al., "On a general theory of anomalies and energy absorption by diffraction gratings and their relation with surface waves," *Optica Acta*, 25, 905–915 (1978). [Pezeshki, et. al., 1990] Pezeshki, B., et. al., "Optimization of modulation ratio and insertion loss in reflective electroabsorption modulators," *Applied Physics Letters*, 57, 1491 (1990). [Prelewitz and Brown, 1994] Prelewitz, D. F., and Brown, T. G., "Optical Limiting and Free-Carrier Dynamics in a Periodic Semiconductor Waveguide," *J. Opt. Soc. Am. B* (2), 304–312 (1994). [Rosenblatt, 1992] Rosenblatt, D., "Distributed Resonant Cavity Light Beam Modulator," U.S. Pat. No. 5,157,537 (Oct. 20, 1992). [Sambles, et. al., 1991] Samhies, J. R., et. al., "Optical Excitation of surface plasons: an introduction," *Contemporary Physics*, 32, 173–183 (1991). [Sauer, et. al., 1988] Sauer, H., et. al., "Optimization of a silicon-on-sapphire waveguide device for optical bistable operation," *J. Opt. Soc. Am. B*, 5 (2), 443–451 (1988). [Simon and Lee, 1988] Simon, H. J., and Lee, C. H., "Electro-optic total internal reflection modulation," *Optics Letters*, 13, 440 (1988). [Soole and Schumacher, 1991] Soole, J. B. D., and Schumacher, H., "InGaAs Metal-Semiconductor-Metal Photodetectors for Long Wavelength Optical Communications," *IEEE J. Quantum Electronics*, 27, 737 (1991). [Soref and Bennett, 1987] Soref, R. A., and Bennett, B. R., "Electrooptical Effects in Silicon," *IEEE J. Quantum Electronics*, QE-23, 123 (1987). [Sze, 1988] Sze, S.M., *VLSI Technology*, New York: McGraw-Hill Book Co. (1988). [Tamir, 1979] Tamir, T., ed., *Integrated Optics*, Berlin: Springer-Verlag (1993). [Treyz, et. al., 1990] Treyz, G. V., et. al., "GaAs multiple quantum well waveguide modulators on silicon substrates," *Applied Physics Letters*, 57, 1078 (1990). [Vincent, 1993] Vincent, P., "Integral equation computation of bump grating efficiencies in TE polarization," *J. Opt. Soc. Am. A*, 10, 444 (1993). [Wang and Magnusson, 1993] Wang, S. S., and Magnusson, R., "Theory and Applications of Guided Mode Resonance Filters," *Applied Optics*, 32, 2606 (1993). [Xiao, et. al, 1991] Xiao, X., et. al., "Fabry-Perot Optical Intensity Modulator at 1.3 μm in Silicon," *IEEE Photonics Technology Letters*, 3, 230 (1991).

What is claimed is:

1. An optoelectronic device for coupling between an external optical wave and a local optical wave comprising:
   a multiplicity of electrodes spaced in a substantially regular pattern, the multiplicity of electrodes adapted to resonantly couple between the external wave and the local wave, the multiplicity of electrodes having a potential difference between adjacent electrodes; and
   a structure associated with the multiplicity of electrodes wherein the structure and the multiplicity of electrodes support the local wave.

2. The device of claim 1 wherein the external wave comprises a wave propagating in a homogeneous medium.

3. The device of claim 2 wherein the multiplicity of electrodes is substantially planar and the external wave is normally incident on the electrodes.

4. The device of claim 2 wherein the multiplicity of electrodes is substantially planar, the external wave is described by a wavevector k and an incidence angle θ, the local wave is described by a propagation constant with real part β, and a spacing of the electrodes is described by a period T according to $\beta = k \sin \theta + 2\pi m/T$, where m is an integer.

5. The device of claim 4 wherein |m|=1.

6. The device of claim 4 wherein |m|=2.

7. The device of claim 1 wherein the local wave comprises a surface plasmon wave.

8. The device of claim 1 wherein the local wave comprises a total-internal-reflection guided wave.

9. The device of claim 1 wherein the local wave comprises a surface evanescent wave.

10. The device of claim 1 wherein the external wave and the local wave lie in the visible part of the electromagnetic spectrum.

11. The device of claim 1 wherein the external wave and the local wave lie in the near-infrared part of the electromagnetic spectrum.

12. The device of claim 1 wherein the external wave and the local wave lie in the ultraviolet part of the electromagnetic spectrum.

13. The device of claim 1 wherein the multiplicity of electrodes comprises metal electrodes.

14. The device of claim 1 wherein the multiplicity of electrodes comprises interdigitated electrodes including first fingers and second fingers and the electrodes are adapted to allow a potential difference between the first fingers and the second fingers.

15. The device of claim 1 wherein the multiplicity of electrodes is substantially planar.

16. The device of claim 1 wherein the structure has an alterable attribute, and the attribute may be altered by varying the potential difference between adjacent electrodes.

17. The device of claim 16 wherein the alterable attribute comprises a refractive index of the structure.

18. The device of claim 16 wherein the alterable attribute comprises a coefficient of birefringence of the structure.

19. The device of claim 16 wherein the alterable attribute comprises an absorption coefficient of the structure.

20. The device of claim 16 wherein the alterable attribute comprises an ability of the structure to absorb optical energy and the absorptive ability is altered based on resonant enhancement.

21. The device of claim 16 wherein the alterable attribute is altered based on the free-carrier plasma effect.

22. The device of claim 16 wherein the alterable attribute is altered based on band filling.

23. The device of claim 16 wherein the alterable attribute is altered based on the quantum confined Stark effect.

24. The device of claim 16 wherein the alterable attribute is altered based on the Franz-Keldysh effect.

25. The device of claim 16 wherein the alterable attribute is altered based on the Kerr effect.

26. The device of claim 16 wherein the alterable attribute is altered based on the Pockels effect.

27. The device of claim 1 wherein the multiplicity of electrodes has an alterable attribute, and the attribute may be altered by varying the potential difference between adjacent electrodes.

28. The device of claim 1 wherein the multiplicity of electrodes is substantially planar and the structure comprises a substantially planar substrate in close proximity to and substantially parallel to the electrodes.

29. The device of claim 28 wherein the substrate comprises a semiconductor.

30. The device of claim 29 wherein the semiconductor comprises silicon.

31. The device of claim 29 wherein the semiconductor comprises a III–V system.

32. The device of claim 29 wherein the semiconductor comprises a II–VI system.

33. The device of claim 29 wherein the semiconductor comprises an AlGaAs compound.

34. The device of claim 29 wherein the semiconductor comprises an InGaAsP compound.

35. The device of claim 29 wherein the semiconductor comprises silicon carbide.

36. The device of claim 29 wherein the electrodes and the semiconductor form an ohmic contact.

37. The device of claim 29 wherein the electrodes and the semiconductor form a Schottky barrier.

38. The device of claim 28 wherein the substrate comprises a silicon-on-insulator structure.

39. The device of claim 28 wherein the substrate comprises a group IV system.

40. The device of claim 28 wherein the structure further comprises a substantially planar cover in close proximity to and substantially parallel to the electrodes, the electrodes being located between the cover and the substrate and the substrate and cover having substantially equal indices of refraction.

41. The device of claim 1 wherein the multiplicity of electrodes is substantially planar and the structure comprises a substantially planar silicon membrane in close proximity to and substantially parallel to the electrodes.

42. The device of claim 1 wherein the structure comprises an electro-optic material.

43. The device of claim 42 wherein the electro-optic material comprises an electro-optic polymer.

44. The device of claim 1 wherein the structure comprises a quantum well structure.

45. The device of claim 1 wherein the structure comprises a superlattice structure.

46. The device of claim 1 wherein the local wave comprises a surface plasmon;

the multiplicity of electrodes comprises substantially planar, metal, interdigitated electrodes including first fingers and second fingers, wherein the electrodes are adapted to allow a potential difference between the first fingers and the second fingers;

the structure comprises a substantially planar semiconductor substrate having an alterable index of refraction, the substrate electrically contacting the electrodes; and the index of refraction of the substrate may be altered by varying the potential difference across the first and second fingers.

47. The device of claim 1 wherein the local wave comprises a total-internal-reflection guided wave;

the multiplicity of electrodes comprises substantially planar, metal, interdigitated electrodes including first fingers and second fingers, wherein the electrodes are adapted to allow a potential difference between the first fingers and the second fingers;

the structure comprises a) p-doped semiconductor regions electrically contacting the first fingers, b) n-doped semiconductor regions electrically contacting the second fingers, and c) a substantially planar semiconductor substrate having an alterable index of refraction, the substrate electrically contacting the n-doped and p-doped semiconductor regions; and the index of refraction of the substrate may be altered by varying the potential difference between the first and second fingers.

48. The device of claim 47 wherein the structure further comprises a substantially planar insulating layer in close proximity to and substantially parallel to the semiconductor substrate.

49. An optical modulator for modulating an output optical wave resulting from an external optical wave comprising:

a multiplicity of electrodes spaced in a substantially regular pattern, the multiplicity of electrodes adapted to
a) resonantly couple between the external wave and a local optical wave,
b) resonantly couple between the external wave and the output wave, and
c) have a potential difference between adjacent electrodes; a structure associated with the multiplicity of electrodes, wherein the structure and the multiplicity of electrodes support the local wave and the structure has an alterable attribute; and a voltage source for impressing the potential difference between adjacent electrodes, whereby the alterable attribute is varied and the output wave is modulated.

50. The modulator of claim 49 wherein the output wave comprises a wave reflected from the electrodes.

51. The modulator of claim 49 wherein the output wave comprises a wave transmitted by the electrodes.

52. An optical detector for sensing the strength of an external optical wave comprising:

a multiplicity of electrodes spaced in a substantially regular pattern, the multiplicity of electrodes adapted to resonantly couple between the external wave and a local optical wave and to allow a potential difference between adjacent electrodes;

a structure associated with the multiplicity of electrodes, wherein the structure and the multiplicity of electrodes support the local wave; and a sensor connected to the electrodes for sensing an electrical quantity.

53. The detector of claim 52 wherein the sensor senses the current flow between adjacent electrodes.

54. The detector of claim 52 wherein the sensor senses the potential difference between adjacent electrodes.

55. The detector of claim 52 wherein the sensor senses the electrical resistance between adjacent electrodes.

56. Method for modulating an output optical wave resulting from an external optical wave comprising:

providing a multiplicity of electrodes arranged in a substantially regular pattern for resonantly coupling between the external wave and a local optical wave and for resonantly coupling between the external wave and the output wave;

positioning a structure associated with the electrodes such that the structure and the electrodes support the local wave, the structure having an alterable attribute;

positioning the electrodes and the structure with respect to the external wave such that the external wave couples to the local wave; and impressing a potential difference between adjacent electrodes.

57. Method for sensing the strength of an external optical wave comprising:

providing a multiplicity of electrodes arranged in a substantially regular pattern for resonantly coupling between the external wave and a local optical wave;

positioning a structure associated with the electrodes such that the structure and the electrodes support the local wave;

positioning the electrodes and the structure with respect to the external wave such that the external wave couples to the local wave; and using adjacent electrodes to sense an electrical quantity related to the strength of the external wave.

\* \* \* \* \*

UNITED STATES PATENT AND TRADEMARK OFFICE
CERTIFICATE OF CORRECTION

PATENT NO. : 5,625,729

DATED : April 29, 1997

INVENTOR(S) : Thomas G. Brown

It is certified that error appears in the above-identified patent and that said Letters Patent is hereby corrected as shown below:

Column 2, lines 8-9: delete "[Maystre, et. al., 1978]" and insert therefor -- Maystre, D., *et al.*, "On a General Theory of Anomalies and Energy Absorption by Diffraction Gratings and their Relation with Surface Waves," *Optica Acta*, 25:905-915 (1978) --;

Column 2, line 9: delete "[Magnusson and Wang, 1993]" and insert therefor -- Magnusson, R., and Wang, S.S., "Optical Guided-Mode Resonance Filter," U.S. Patent 5,216,680 (June 1, 1993) --;

Column 2, lines 9-10: delete "[Delort and Maystre, 1993]" and insert therefor -- Delort, T., and Maystre, D., "Finite Element Method for Gratings," *J. Opt. Soc. Am. A.*, 10:2592 (1993) --;

Column 2, line 10: delete "[Vincent, 1993]" and insert therefor -- Vincent, P., "Integral Equation Computation of Bump Grating Efficiencies in TE Polarization," *J. Opt. Soc. Am. A.*, 10:444 (1993) --;

Column 2, line 18: delete "[Campbell, 1993]" and insert therefor -- Campbell, P., "Enhancement of Ligh Absorption from Randomizing and Geometric Textures," *J. Opt. Soc. Am. B.*, 10:2410 (1993) --;

Column 2, lines 20-21: delete "[Sambles, et. al., 1991]" and insert therefor -- Sambles, J.R., *et al.*, "Optical Excitation of Surface Plasons: An Introduction," *Contemporary Physics*, 32:173-183 (1991) --;

Column 2, line 23: delete "[Bryan-Brown, et. al., 1991]" and insert therefor -- Bryan-Brown, G.P., *et al.*, "Coupled Surface Plasmons on Silver Coated Gratings," *Optics Communications*, 82:1 (1991) --;

UNITED STATES PATENT AND TRADEMARK OFFICE
CERTIFICATE OF CORRECTION

PATENT NO. : 5,625,729
DATED : April 29, 1997
INVENTOR(S) : Thomas G. Brown

It is certified that error appears in the above-identified patent and that said Letters Patent is hereby corrected as shown below:

Column 2, lines 33-34: delete "[Simon and Lee, 1988]" and insert therefor -- Simon, H.J., and Lee, C.H., "Electro-Optic Total Internal Reflection Modulation," *Optics Letters*, 13:440 (1988) --;

Column 2, line 34: delete "[Caldwell and Yearman, 1991]" and insert therefor -- Caldwell, M.E. and Yearman, E.M., "Recent Advances in Surface Plasnon Spatial Light Modulators," *SPIE Proceedings: Optics for Computer-Architecutres and Technologies*, 1505:50 (1991) --;

Column 2, line 41: delete "[Evans and Hall, 1990]" and insert therefor -- Evans, A.E., and Hall, D.G., "Measurement of the Electrically Inducted Refractive Index Change in Silicon for Wavelength $\lambda=1.3\mu m$ Using a Schottky Diode," *Appl. Phys. Lett.*, 56:212 (1990) --;

Column 2, lines 41-42: delete "[Collins, et. al., 1990]" and insert therefor -- Collins, R.T., *et al.*, "Optical Modulator," U.S. Patent 4,915,482 (April 10, 1990) --;

Column 2, lines 51-52: delete "[Magnusson and Wang, 1993]" and insert therefor -- Magnusson, R., and Wang, S.S., "Optical Guided-Mode Resonance Filter," U.S. Patent 5,216,680 (June 1, 1993) --;

Column 2, line 52: delete "[Wang and Magnusson, 1993]" and insert therefor -- Wang, S.S., and Magnusson, R., "Theory and Applications of Guided Mode Resonance Filters," *Applied Optics*, 32:2606 (1993) --;

UNITED STATES PATENT AND TRADEMARK OFFICE
CERTIFICATE OF CORRECTION

PATENT NO. : 5,625,729
DATED : April 29, 1997
INVENTOR(S) : Thomas G. Brown

It is certified that error appears in the above-identified patent and that said Letters Patent is hereby corrected as shown below:

Column 2, line 53: delete "[Rosenblatt, 1992]" and insert therefor -- Rosenblatt, D., "Distributed Resonant Cavity Light Beam Modulator," U.S. Patent 5,157,537 (October 20, 1992) --;

Column 2, lines 59-60: delete "[Brueck, et. al., 1985]" and insert therefor -- Brueck, S.R.J., *et al.*, "Enhanced Quantum Efficiency Internal Photoemission Detectors by Grating Coupling to Surface Plasma Waves," *Appl. Phys. Lett.*, 46:915 (1985) --;

Column 3, line 1: delete "[Lentine, et. al., 1989]" and insert therefor -- Lentine, A.L., *et al.*, "Symmetric Self-Electrooptic Effect Device: Optical Set-Reset Latch, Differential Logic Gate, and Differential Modulator Detector," *IEEE J. Quantum Electronics*, 25:1928 (1989) --;

Column 3, line 1: delete "[Pezeshki, et. al., 1990]" and insert therefor -- Pezeshki, B., *et al.*, "Optimization of Modulation Ratio and Insertion Loss in Reflective Electroabsorption Modulators," *Appl. Phys. Lett.*, 57:1491 (1990) --;

Column 3, line 2: delete "[Treyz, et. al., 1990]" and insert therefor -- Treyz, G.V., *et al.*, "GaAs Multiple Quantum Well Waveguide Modulators on Silicon Substrates," *Appl. Phys. Lett.*, 57:1078 (1990) --;

Column 3, line 2: delete "[Xiao, et. al., 1991]" and insert therefor -- Xizo, X., *et al.*, "Fabry-Perot Optical Intensity Modulator at 1.3$\mu$m in Silicon," *IEEE Photonics Technology Letters*, 3:320 (1991) --;

UNITED STATES PATENT AND TRADEMARK OFFICE
CERTIFICATE OF CORRECTION

PATENT NO. : 5,625,729
DATED : April 29, 1997
INVENTOR(S) : Thomas G. Brown

It is certified that error appears in the above-identified patent and that said Letters Patent is hereby corrected as shown below:

Column 3, line 17: delete "[Alferness, 1982]" and insert therefor -- Alferness, R.C., "Waveguide Electrooptic Modulators," *IEEE Transactions on microwave Theory and Techniques*, MTT-30:1121 (1982) --;

Column 3, line 17: delete "[Hammer, et. al., 1973]" and insert therefor -- Hammer, J.M., *et al.*, "Fast Electro-Optic Waveguide Deflector Modulator," *Appl. Phys. Lett.*, 23:176 (1973) --;

Column 3, line 28: delete "[Alexandrou, et. al., 1993]" and insert therefor -- Alexandrou, S., *et al.*, "A 75 Ghz Silicon Metal-Semiconductor-Metal Schottky Photodiode," *Appl. Phys. Lett.*, 62:2507 (1993) --;

Column 8, line 49: after "point" and before "Instead" please insert -- . --;

Column 10, line 18: delete "[Blakemore, 1985]" and insert therefor --
J.S.Blakemore, *Solid State Physics*, 2nd. ed., Cambridge:Cambridge University Press, 157-169 (1985) --;

Column 10, line 28: delete "[Sauer, et. al., 1988]" and insert therefor -- Sauer, H., *et al.*, "Optimization of a Silicon-on-Sapphire Waveguide Device for Optical Bistable Operation," *J. Opt. Soc. Am. B.*, 5(2):443-451 (1988) --;

Column 10, line 30: delete "desireable" and insert therefor -- desirable --;

Column 11, line 49: delete "reversed" and insert therefor -- reverse --;

Column 11, line 51: delete "interlace" and insert therefor -- interface --;

UNITED STATES PATENT AND TRADEMARK OFFICE
CERTIFICATE OF CORRECTION

PATENT NO. : 5,625,729
DATED : April 29, 1997
INVENTOR(S) : Thomas G. Brown

It is certified that error appears in the above-identified patent and that said Letters Patent is hereby corrected as shown below:

Column 12, line 4: delete "Ibm" and insert therefor -- form --; and

Column 13, lines 4-5: delete "[Evans and Hall, 1991]" and insert therefor -- Evans, A.E., and Hall, D.G., "Propagation Loss Measurements in Silicon-on-Insulator Optical Waveguides Formed by Bond-and-Etchback Process," *Appl. Phys. Lett.*, 59:1667-1669 (1991).

Signed and Sealed this

Thirteenth Day of January, 1998

Attest:

BRUCE LEHMAN

Attesting Officer

Commissioner of Patents and Trademarks